(12) United States Patent
Takemoto et al.

(10) Patent No.: US 7,764,587 B2
(45) Date of Patent: Jul. 27, 2010

(54) OPTICAL PICKUP APPARATUS

(75) Inventors: Seiji Takemoto, Osaka (JP); Hitoshi Fujii, Osaka (JP); Mitsuyoshi Sasabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 482 days.

(21) Appl. No.: 11/980,631

(22) Filed: Oct. 31, 2007

(65) Prior Publication Data
US 2008/0106983 A1 May 8, 2008

(30) Foreign Application Priority Data
Nov. 6, 2006 (JP) ............... 2006-299832

(51) Int. Cl.
*G11B 7/00* (2006.01)
(52) U.S. Cl. ............... 369/112.02; 369/112.28; 369/112.29
(58) Field of Classification Search ............ 369/112.02, 369/112.09, 112.14, 112.21, 112.28, 112.29, 369/44.23
See application file for complete search history.

(56) References Cited

U.S. PATENT DOCUMENTS

| 3,843,231 | A | | 10/1974 | Borel et al. | |
|---|---|---|---|---|---|
| 6,025,953 | A | * | 2/2000 | Bu et al. | 359/291 |
| 6,038,204 | A | * | 3/2000 | Yang et al. | 369/112.29 |
| 6,496,453 | B2 | | 12/2002 | Asada et al. | |
| 2002/0093902 | A1 | | 7/2002 | Hirai et al. | |
| 2007/0097836 | A1 | * | 5/2007 | Kurozuka et al. | 369/112.29 |

FOREIGN PATENT DOCUMENTS

| JP | 03-107931 | 5/1991 |
|---|---|---|
| JP | 2000-099978 | 4/2000 |
| JP | 2002-208163 | 7/2002 |
| JP | 2003-030887 | 1/2003 |
| JP | 2005-122878 | 5/2005 |
| JP | 2005-309351 | 11/2005 |
| JP | 2006-155827 | 6/2006 |
| JP | 2006-331531 | 12/2006 |
| WO | WO 2006/018758 A1 | 2/2006 |

* cited by examiner

*Primary Examiner*—Thang V Tran
(74) *Attorney, Agent, or Firm*—Morgan Lewis & Bockius LLP

(57) ABSTRACT

An optical pickup apparatus includes a plurality of laser light sources, a single objective lens, and a beam shaping mirror. The beam shaping mirror causes each of the laser beams to be incident on a transmission surface, reflects the beam from a reflection surface being unparallel to the transmission surface and causes the beam to emerge from the transmission surface, thereby to convert a light intensity distribution of the beam of each of the wavelengths from an elliptic shape into a circular shape. The beam shaping mirror is made of a liquid crystal, which forms the transmission surface and the reflection surface, and is electrically driven so that a refractive index of the liquid crystal may be held constant irrespective of the wavelengths of the beams each of which enters the beam shaping mirror.

13 Claims, 3 Drawing Sheets

OPTICAL PICKUP APPARATUS

This application is based on Japanese Patent Application No. 2006-299832 filed on Nov. 6, 2006, the contents of which are hereby incorporated by reference.

BACKGROUND OF THE INVENTION

1. Field of the Invention

The present invention relates to an optical pickup apparatus, and more particularly to an optical pickup apparatus which is adapted for a plurality of sorts of optical discs, for example, a CD (compact disc), a DVD (digital versatile disc) and a BD (high-density optical disc employing blue laser beams such as blu-ray disc).

2. Description of Related Art

In, for example, an optical pickup apparatus of plural-wavelength and single-lens type which is adapted for a plurality of sorts of optical discs (for example, a CD, a DVD and a BD) of different wavelengths for use by employing a single objective lens, when it is intended to obtain satisfactory reproduced signals from all the optical discs, a beam spot which is formed by the objective lens needs to be brought into a circular shape of small diameter. Besides, the inclinations and positional deviations of laser beams relative to an optical axis need to be corrected so that all the laser beams may enter the objective lens along the same optical paths.

Regarding the spot shape, Patent Document 1 (being JP-A-2005-309351), etc. have proposed an optical pickup apparatus wherein a rim intensity (that is, the peripheral intensity ratio of a light beam entering the objective lens) is corrected by employing a beam shaping element (for example, a prism or a cylindrical lens) which converts the laser beam from an elliptic beam into the circular beam. Regarding the optical paths of the laser beams, Patent Documents 2, 3 and 4 (being JP-A-2000-99978, JP-A-2002-208163 and JP-A-2003-30887, respectively) have proposed optical pickup apparatuses of dual-wavelength and single-lens type wherein the optical paths to the objective lens are synthesized by a prism which has a beam shaping function. The prism includes a surface which transmits the laser beam of one wavelength therethrough and which reflects the laser beam of the other wavelength therefrom, and it is configured so as to synthesize the optical paths by the surface. Besides, Patent Document 5 (being JP-A-2005-122878) has proposed an optical pickup apparatus wherein an upstand mirror which is made of a liquid crystal element for making wavefront corrections by a predetermined refractive index distribution is employed as means for correcting the laser beams that are to enter the objective lens. Patent Document 6 (being JP-A-2006-155827) has proposed an optical pickup apparatus wherein a variable focus type liquid crystal element whose refractive index is electrically controllable is disposed in the vicinity of an upstand mirror.

However, when the beam shaping elements as proposed in Patent Document 1 are arranged for the respective wavelengths, the whole optical system of the optical pickup apparatus becomes large in size and complicated in structure. Besides, in case of each of the optical pickup apparatuses of the dual-wavelength and single-lens type as proposed in Patent Documents 2 to 4, the laser beam of the wavelength which is reflected from the surface of the prism for synthesizing the optical paths is not subjected to beam shaping. That is, only the beam shaping of one wavelength can be performed, and a high output is required for the laser light source of the other wavelength. Each of the optical pickup apparatuses proposed in Patent Documents 5 and 6 is configured so as to change the refractive index distribution or refracting power of the liquid crystal element, so that the optical paths to the objective lens cannot be synthesized by the liquid crystal element.

SUMMARY OF THE INVENTION

An object of the present invention is to provide an optical pickup apparatus in which, in spite of a simple and compact configuration, favorable signals are obtained by the shapings of beams of a plurality of wavelengths and the inclination corrections and positional deviation corrections thereof relative to an optical axis.

In an aspect of the present invention, an optical pickup apparatus is an optical pickup apparatus of plural-wavelength and single-lens type wherein a plurality of sorts of optical discs of different wavelengths for use are coped with by a plurality of laser light sources which emit laser beams of wavelengths different from each other, and a single objective lens, characterized by having a beam shaping mirror which is included in optical paths between the objective lens and the plurality of laser light sources, and which causes each of the laser beams to be incident on a transmission surface, reflects the laser beam from a reflection surface being unparallel to the transmission surface and causes the laser beam to emerge from the transmission surface, thereby to convert a light intensity distribution of the laser beam of each of the wavelengths from an elliptic shape into a circular shape; wherein the beam shaping mirror is made of a liquid crystal which forms the transmission surface and the reflection surface in a predetermined filled-up state, and the liquid crystal is electrically driven so that a refractive index of the liquid crystal may be held constant irrespective of the wavelengths of the laser beams which enter the beam shaping mirror.

DETAILED DESCRIPTION OF THE PREFERRED EMBODIMENTS

Figure 1:
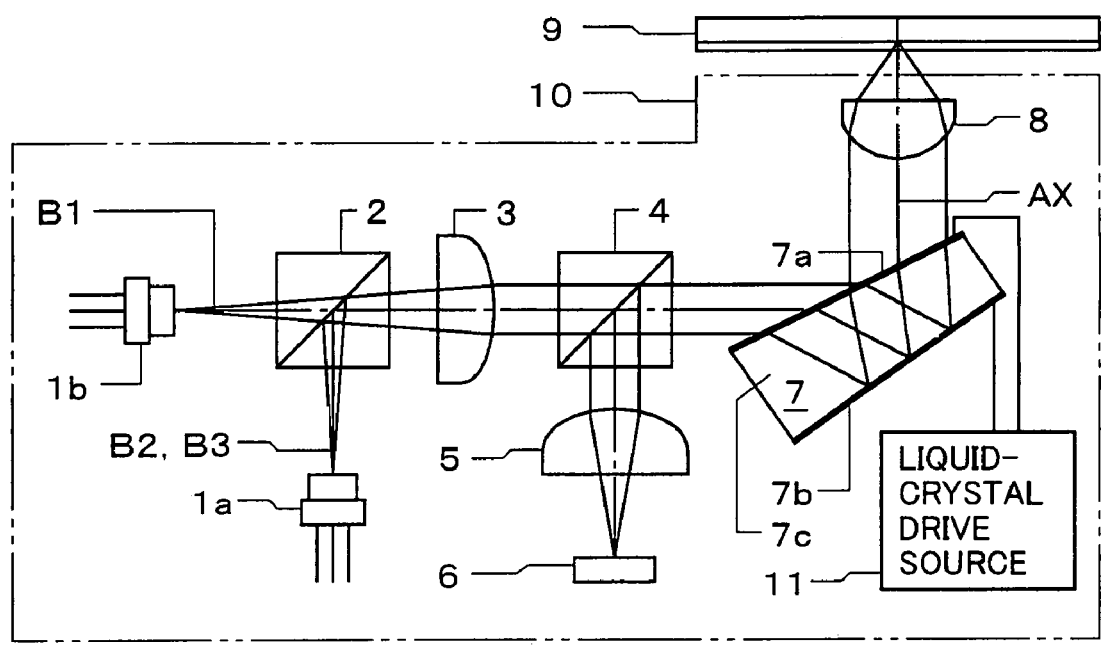
FIG. 1 is a schematic diagram showing an embodiment of an optical pickup apparatus.

Embodiments of an optical pickup apparatus according to the present invention and the like will be described below, with reference to the drawings. FIG. 1 schematically shows the general configuration of an embodiment of the optical pickup apparatus. This optical pickup apparatus 10 is an optical pickup apparatus of triple-wavelength and single-lens type in which three sorts of optical discs 9 of different wavelengths for use are coped with by three laser light sources of different lasing wavelengths (as consist of two light sources mounted on a dual-wavelength semiconductor laser 1a for red/infrared uses, and one light source mounted on a semiconductor laser 1b for blue use), and one objective lens 8, and it is configured so as to be capable of recording/reproducing information onto/from any of the three sorts of optical discs 9.

The three sorts of optical discs 9 supposed here are, for example, a first optical disc corresponding to a blue laser (wavelength: 405 nm) (a high-density optical disc which employs a blue laser beam, and which has a substrate thickness of 0.1 mm and a numerical aperture of NA=0.85), a second optical disc corresponding to a red laser (wavelength: 650 nm) (a DVD which has a substrate thickness of 0.6 mm and NA=0.6 to 0.65), and a third optical disc corresponding to an infrared laser (wavelength: 780 nm) (a CD which has a substrate thickness of 1.2 mm and NA=0.45 to 0.5). However, the wavelengths for use are not limited to the values mentioned above. Besides, objects to which the invention is applied are not limited to the optical discs, but the invention is also applicable to optical information record media other than the optical discs.

The optical pickup apparatus 10 shown in FIG. 1 is configured of the dual-wavelength semiconductor laser 1a for the red/infrared uses, the semiconductor laser 1b for the blue use, a dichroic prism 2, a collimator lens 3, a beam splitter 4, a condenser lens 5, a photodetector 6, a beam shaping mirror 7, the objective lens 8, and so forth. The optical configuration of the optical pickup apparatus 10 will be described along optical paths below.

As stated before, the optical pickup apparatus 10 includes as the laser light sources, the two light sources which are mounted on the dual-wavelength semiconductor laser 1a for the red/infrared uses, and the single light source which is mounted on the semiconductor laser 1b for the blue use. In addition, optical information is recorded onto or reproduced from the corresponding optical disc 9 by the blue laser beam B1, the red laser beam B2 or the infrared laser beam B3 which is emitted in such a way that any of the three laser light sources is lit up.

The laser beam B1, B2 or B3 emitted from the semiconductor laser 1a or 1b enters the dichroic prism 2. The dichroic prism 2 is an optical-path synthesis element which synthesizes the optical paths of the blue, red and infrared laser beams B1 to B3. Accordingly, the blue laser beam B1 emitted from the semiconductor laser 1b is transmitted through the dichroic prism 2, and the red laser beam B2 or the infrared laser beam B3 emitted from the semiconductor laser 1a is reflected from the dichroic prism 2, whereby the optical paths of the respective laser beams B1 to B3 are synthesized.

The laser beam B1, B2 or B3 emergent from the dichroic prism 2 is turned into a collimated beam by the collimator lens 3, and part of the collimated beam is thereafter transmitted through the beam splitter 4. The beam splitter 4 is an optical-path branch element which branches an optical path from the semiconductor laser 1a or 1b to the optical disc 9 and an optical path from the optical disc 9 to the photodetector 6, and it functions as a half mirror which divides the light quantity of incident light into those of transmitted light and reflected light.

The laser beam B1, B2 or B3 transmitted through the beam splitter 4 enters the beam shaping mirror 7. The beam shaping mirror 7 causes the laser beam B1, B2 or B3 to be incident on a transmission surface 7a, subsequently reflects it from a reflection surface 7b unparallel to the transmission surface 7a, and finally causes it to emerge from the transmission surface 7a. Besides, the beam shaping mirror 7 is made of a liquid crystal 7c which forms the transmission surface 7a and the reflection surface 7b in a filled-up state having a trapezoidal section. The laser beam B1, B2 or B3 of each wavelength has its optical path bent substantially 90° toward the objective lens 8 by the function of the beam shaping mirror 7 as a upstand mirror, and has its light intensity distribution converted from an elliptic shape into a circular shape by a beam shaping function. The details of the beam shaping mirror 7 will be explained later.

The laser beam B1, B2 or B3 emergent from the beam shaping mirror 7 is condensed by the objective lens 8, and it reaches the record surface of the optical disc 9 so as to be focused. In an information reproduction mode, the laser beam B1, B2 or B3 reflected from the record surface of the optical disc 9 passes through the objective lens 8 and is reflected by the beam shaping mirror 7, and part of the reflected beam is thereafter reflected by the beam splitter 4. The laser beam B1, B2 or B3 reflected by the beam splitter 4 is condensed by the condenser lens 5, and it reaches the light reception face of the photodetector 6 so as to be focused. The photodetector 6 detects the optical information of the received laser beam B1, B2 or B3, and it outputs the optical information as an electric signal.

Figure 2A:
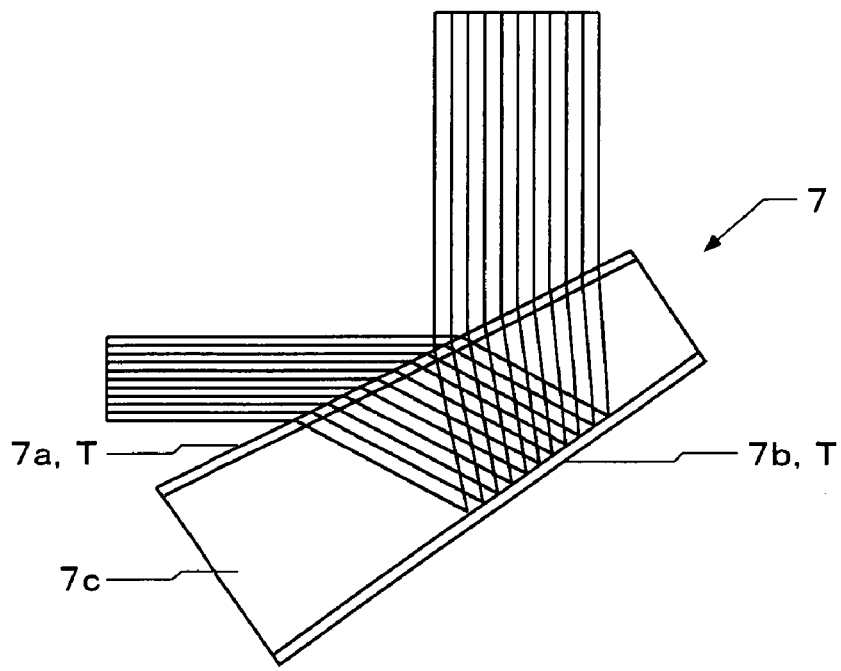
FIGS. 2A and 2B are diagrams each showing the section of a beam shaping mirror and an optical path.

In general, the beam shaping of converting a laser beam from an elliptic beam into a circular beam includes a type in which the diameter of the beam is enlarged in the direction of the minor axis of an elliptic beam section, and a type in which the beam diameter is reduced in the direction of the major axis of the elliptic beam section. The optical pickup apparatus 10 shown in FIG. 1 adopts the beam shaping of the type in which the beam diameter is enlarged in the direction of the minor axis of the elliptic beam section. However, the type in which the beam diameter is reduced in the direction of the major axis of the elliptic beam section can also be adopted for the optical pickup apparatus 10 by altering the arrangement of the beam shaping mirror 7. FIG. 2A shows the arrangement of the beam shaping mirror 7 in the case of enlarging the beam diameter in the direction of the minor axis of the elliptic beam section, and an optical path on that occasion, while FIG. 2B shows the arrangement of the beam shaping mirror 7 in the case of reducing the beam diameter in the direction of the major axis of the elliptic beam section, and an optical path on that occasion.

Figure 2B:
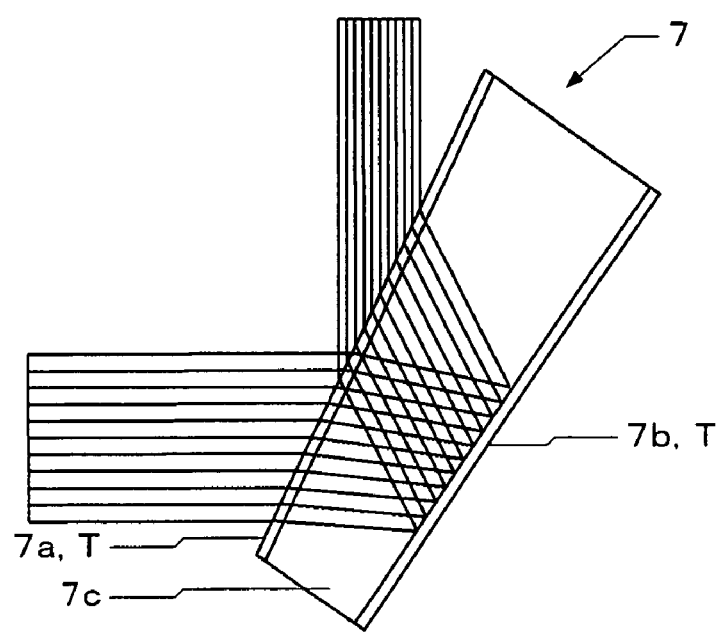

Whichever of the types shown in FIGS. 2A and 2B is employed for the beam shaping, the light intensity distribution of the laser beam can be converted from the elliptic shape into the ideal circular shape in such a way that an angle, an interval, etc. which are defined between the transmission surface 7a and the reflection surface 7b are adjusted to predetermined magnitudes. Accordingly, a favorable beam spot of high rim intensity can be formed on the record surface of the optical disc 9. Incidentally, the reflecting function of the reflection surface 7b can be attained by, for example, a metal film or a dielectric multilayer film.

Figure 3A:
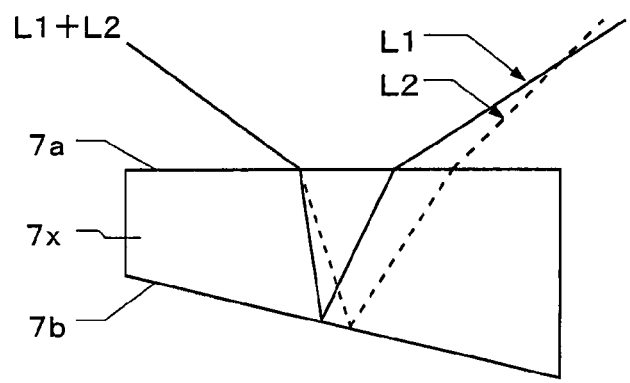
FIGS. 3A to 3C are optical path diagrams each for explaining an inclination correction and a positional deviation correction relative to an optical axis by the beam shaping mirror.

In a general prism-type beam shaping element having hitherto been known, beam shaping is performed by a transparent member which has a transmission surface and a reflection surface being unparallel to each other. Therefore, a laser beam incident on the transmission surface is refracted at an angle differing every wavelength, on account of the dispersion characteristic of the transparent member. In a case, for example, where a blue laser beam L1 and a red laser beam L2 have entered a transparent member 7x at the same angle of incidence as shown in FIG. 3A, a refractive index for the blue laser beam L1 is larger than a refractive index for the red laser beam L2, and hence, the directions and positions of the beams L1 and L2 to emerge from the transparent member 7x become different on account of the difference of refractive angles at a transmission surface 7a at the incidence of the beams (that is, on account of the dispersion characteristic). As a result, inclinations and positional deviations relative to the optical axis AX of the objective lens 8 must be corrected so that both the blue laser beam L1 and the red laser beam L2 may enter the objective lens 8 (FIG. 1) along the same optical paths. In this embodiment, the problem is solved by employing as the beam shaping mirror 7, the liquid crystal 7c which forms the transmission surface 7a and the reflection surface 7b.

As shown in FIG. 1, the optical pickup apparatus 10 includes a liquid-crystal drive source 11 which electrically drives the liquid crystal 7c so that the refractive index of the liquid crystal 7c may be held constant irrespective of the wavelengths of the laser beams B1, B2 and B3 which enter the beam shaping mirror 7. As shown in FIGS. 2A and 2B, transparent electrodes T are respectively formed on the transmission surface 7a and the reflection surface 7b of the liquid crystal 7c. The refractive indices of the liquid crystal 7c can be made the same for all the laser beams B1, B2 and B3 by adjusting a voltage which is applied from the drive source 11 to the liquid crystal 7c through the transparent electrodes T.

Figure 3B:
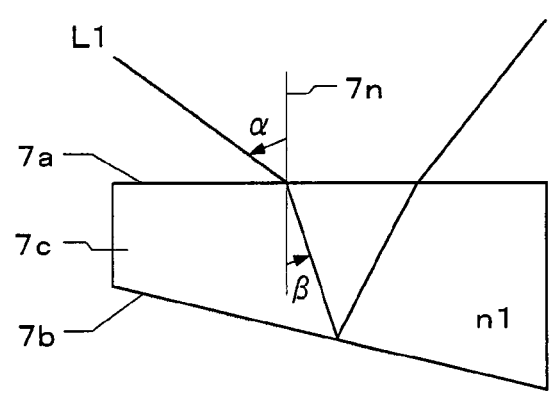
Figure 3C:
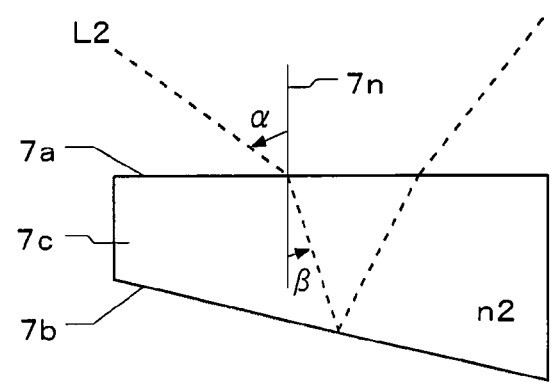

By way of example, if a refractive index n1 for the blue laser beam L1 as shown in FIG. 3B and a refractive index n2 for the red laser beam L2 as shown in FIG. 3C are the same, no dispersion will occur. That is, both the blue laser beam L1 and the red laser beam L2 which have incided on the transmission surface 7a at an angle of incidence α are refracted at the same angle of refraction β (7n: a normal to the transmission surface 7a). As a result, both the blue laser beam L1 and the red laser beam L2 emerge from the beam shaping mirror 7 along the same optical path. Accordingly, no deviations appear in the inclinations and positions of the respective laser beams L1 and L2 relative to the optical axis AX of the objective lens 8.

In order to make the refractive index n1 for the blue laser beam L1 and the refractive index n2 for the red laser beam L2 the same, different voltages may be applied to the liquid crystal 7c between at the use of the blue laser beam L1 and at the use of the red laser beam L2. Besides, the liquid-crystal drive source 11 may be adjusted in its ON state so that the refractive index n2 for the red laser beam L2 may be brought into agreement with the refractive index n1 for the blue laser beam L1 in the OFF state of the liquid-crystal drive source 11. Alternatively, the liquid-crystal drive source 11 may be adjusted in its ON state so that the refractive index n1 for the blue laser beam L1 may be brought into agreement with the refractive index n2 for the red laser beam L2 in the OFF state of the liquid-crystal drive source 11.

Since the optical pickup apparatus 10 shown in FIG. 1 copes with the three wavelengths, different voltages may be applied to the liquid crystal 7c among at the use of the blue laser beam B1, at the use of the red laser beam B2 and at the use of the infrared laser beam B3. Besides, the liquid-crystal drive source 11 may be adjusted in its ON state so that the refractive indices for the red laser beam B2 and the infrared laser beam B3 may be brought into agreement with the refractive index for the blue laser beam B1 in the OFF state of the liquid-crystal drive source 11. Alternatively, the liquid-crystal drive source 11 may be adjusted in its ON state so that the refractive indices for the blue laser beam B1 and the infrared laser beam B3 may be brought into agreement with the refractive index for the red laser beam B2 in the OFF state of the liquid-crystal drive source 11. Still alternatively, the liquid-crystal drive source 11 may be adjusted in its ON state so that the refractive indices for the blue laser beam B1 and the red laser beam B2 may be brought into agreement with the refractive index for the infrared laser beam B3 in the OFF state of the liquid-crystal drive source 11.

As described above, the optical pickup apparatus 10 is so configured that the beam shaping mirror 7 is made of the liquid crystal 7c which forms the transmission surface 7a and the reflection surface 7b in the predetermined filled-up state, and that the liquid crystal 7c is electrically driven so as to hold the refractive index of the liquid crystal 7c constant irrespective of the wavelengths of the laser beams B1, B2 and B3 entering the beam shaping mirror 7. Therefore, the inclinations and the positional deviations relative to the optical axis AX can be corrected by the refractive index control of the liquid crystal 7c so that the laser beams B1, B2 and B3 of all the three wavelengths may enter the objective lens 8 along the same optical path, without increasing the number of components. Thus, it is permitted for the three wavelengths to sufficiently focus the favorable beam spot of high rim intensity in the optical intensity distribution which is near the circular shape. Besides, as compared with an optical system in which beam shaping elements such as cylindrical lenses are arranged for the respective wavelengths, the whole optical system can be configured in a smaller size and with a simpler structure. Accordingly, favorable signals (for example, record signals and reproduction signals) can be obtained by the beam shapings of the three wavelengths and the inclination corrections and positional deviation corrections relative to the optical axis AX, in spite of the simple and compact configuration.

The beam shaping mirror 7 is made of the liquid crystal 7c, and the liquid crystal 7c forms the transmission surface 7a and the reflection surface 7b in the filled-up state having the trapezoidal section, so that reduction in the size of the optical pickup apparatus 10 can be achieved more effectively. Besides, in the case where the liquid-crystal drive source 11 for electrically driving the liquid crystal 7c is adjusted in its ON state so that the refractive index for the specified wavelength in the OFF state of the liquid-crystal drive source 11 may be set as the reference refractive index and that the refractive indices for the other wavelengths may be brought into agreement with the reference refractive index, the inclination corrections and positional deviation corrections relative to the optical axis AX can be effectively made by the simpler control configuration.

Besides, since the refractive index of the liquid crystal 7c is the same for all the wavelengths for use, an interchangeability for the plurality of sorts of optical discs 9 can be ensured. By way of example, when the blue laser beam B1 and the red laser beam B2 are employed, the two sorts of optical discs 9 of the DVD and BD can be coped with, and when the blue laser beam B1, the red laser beam B2 and the infrared laser beam B3 are employed, the three sorts of optical discs 9 of the CD, DVD and BD can be coped with.

As understood from the above description, in an optical pickup apparatus of plural-wavelength and single-lens type, a beam shaping mirror is made of a liquid crystal which forms a transmission surface and a reflection surface in a predetermined filled-up state, and the liquid crystal is electrically driven so as to hold the refractive index of the liquid crystal constant irrespective of the wavelengths of laser beams which enter the beam shaping mirror, whereby inclinations and positional deviations relative to an optical axis can be corrected by the refractive index control of the liquid crystal so that the laser beams of all the plurality of wavelengths may enter an objective lens along the same optical path, without increasing the number of components. Thus, it is permitted for the plurality of wavelengths to sufficiently focus a favorable beam spot of high rim intensity in a light intensity distribution near a circular shape. Besides, as compared with an optical system in which beam shaping elements such as cylindrical lenses are arranged for the respective wavelengths, the whole optical system can be configured in a smaller size and with a simpler structure. Accordingly, favorable signals (for example, record signals and reproduction signals) can be obtained by the beam shapings of the plurality of wavelengths and the inclination corrections and positional deviation corrections relative to the optical axis, in spite of the simple and compact configuration.

In the case where the beam shaping mirror is made of the liquid crystal and where the liquid crystal forms the transmission surface and the reflection surface in the filled-up state having a trapezoidal section, reduction in the size of the optical pickup apparatus can be achieved more effectively. Besides, in a case where a liquid-crystal drive source for electrically driving the liquid crystal is disposed and where the liquid-crystal drive source is adjusted in its ON state so that a refractive index for a specified wavelength in the OFF state of the liquid-crystal drive source may be set as a reference refractive index and that refractive indices for the other wavelengths may be brought into agreement with the reference refractive index, the inclination corrections and positional deviation corrections relative to the optical axis can be effectively made by the simpler control configuration.

Since the refractive index of the liquid crystal is the same for all the wavelengths for use, an interchangeability for a plurality of sorts of optical discs can be ensured. By way of example, when a blue laser beam and a red laser beam are employed as laser beams which are emitted from two laser light sources, the two sorts of optical discs of a DVD and a BD can be coped with, and when the blue laser beam, the red laser beam and an infrared laser beam are employed as laser beams which are emitted from three laser light sources, the three sorts of optical discs of a CD, the DVD and the BD can be coped with.

What is claimed is:

1. An optical pickup apparatus of plural-wavelength and single-lens type wherein a plurality of sorts of optical discs of different wavelengths for use are coped with by a plurality of laser light sources which emit laser beams of wavelengths different from each other, and a single objective lens, comprising:
   a beam shaping mirror which is included in optical paths between the objective lens and the plurality of laser light sources, and which causes each of the laser beams to be incident on a transmission surface, reflects the laser beam from a reflection surface being unparallel to the transmission surface and causes the laser beam to emerge from the transmission surface, thereby to convert a light intensity distribution of the laser beam of each of the wavelengths from an elliptic shape into a circular shape;
   wherein said beam shaping mirror is made of a liquid crystal which forms the transmission surface and the reflection surface in a predetermined filled-up state, and the liquid crystal is electrically driven so that a refractive index of the liquid crystal is held constant irrespective of the wavelengths of the laser beams which enter said beam shaping mirror.

2. The optical pickup apparatus according to claim 1, wherein said beam shaping mirror is made of the liquid crystal which forms the transmission surface and the reflection surface in the filled-up state having a trapezoidal section.

3. The optical pickup apparatus according to claim 1, further comprising a liquid-crystal drive source which electrically drives the liquid crystal;
   wherein said liquid-crystal drive source is adjusted in its ON state so that the refractive index for a specified one of the wavelengths in an OFF state of said liquid-crystal drive source is set as a reference refractive index, and that the refractive index for the other wavelength may be brought into agreement with the reference refractive index.

4. The optical pickup apparatus according to claim 1, wherein the laser beams which are emitted from the plurality of laser light sources are a blue laser beam and a red laser beam.

5. The optical pickup apparatus according to claim 2, further comprising a liquid-crystal drive source which electrically drives the liquid crystal;
   wherein said liquid-crystal drive source is adjusted in its ON state so that the refractive index for a specified one of the wavelengths in an OFF state of said liquid-crystal drive source is set as a reference refractive index, and that the refractive index for the other wavelength is brought into agreement with the reference refractive index.

6. The optical pickup apparatus according to claim 2, wherein the laser beams which are emitted from the plurality of laser light sources are a blue laser beam and a red laser beam.

7. The optical pickup apparatus according to claim 3, wherein the laser beams which are emitted from the plurality of laser light sources are a blue laser beam and a red laser beam.

8. The optical pickup apparatus according to claim 5, wherein the laser beams which are emitted from the plurality of laser light sources are a blue laser beam and a red laser beam.

9. An optical pickup apparatus of triple-wavelength and single-lens type wherein three sorts of optical discs of different wavelengths for use are coped with by three laser light sources which emit a blue laser beam, a red laser beam and an infrared laser beam, respectively, and a single objective lens, comprising:
   a beam shaping mirror which is included in optical paths between the objective lens and the three laser light sources, and which causes each of the laser beams to be incident on a transmission surface, reflects the laser beam from a reflection surface being unparallel to the transmission surface and causes the laser beam to emerge from the transmission surface, thereby to convert a light intensity distribution of the laser beam of each of the wavelengths from an elliptic shape into a circular shape;
   wherein said beam shaping mirror is made of a liquid crystal which forms the transmission surface and the reflection surface in a predetermined filled-up state, and the liquid crystal is electrically driven so that a refractive index of the liquid crystal is held constant irrespective of the wavelengths of the laser beams which enter said beam shaping mirror.

10. The optical pickup apparatus according to claim 9, wherein said beam shaping mirror is made of the liquid crystal which forms the transmission surface and the reflection surface in the filled-up state having a trapezoidal section.

11. The optical pickup apparatus according to claim 9, further comprising a liquid-crystal drive source which electrically drives the liquid crystal;
   wherein said liquid-crystal drive source is adjusted in its ON state so that the refractive index for a specified one of the wavelengths in an OFF state of said liquid-crystal drive source is set as a reference refractive index, and that the refractive indices for the other wavelengths is brought into agreement with the reference refractive index.

12. The optical pickup apparatus according to claim 10, further comprising a liquid-crystal drive source which electrically drives the liquid crystal;
   wherein said liquid-crystal drive source is adjusted in its ON state so that the refractive index for a specified one of the wavelengths in an OFF state of said liquid-crystal drive source is set as a reference refractive index, and that the refractive indices for the other wavelengths is brought into agreement with the reference refractive index.

13. An optical pickup apparatus of triple-wavelength and single-lens type wherein three sorts of optical discs of different wavelengths for use are coped with by three laser light sources which emit a blue laser beam, a red laser beam and an infrared laser beam, respectively, and a single objective lens, comprising:

a beam shaping mirror which is included in optical paths between the objective lens and the three laser light sources, which causes each of the laser beams to be incident on a transmission surface, reflects the laser beam from a reflection surface being unparallel to the transmission surface and causes the laser beam to emerge from the transmission surface, thereby to convert a light intensity distribution of the laser beam of each of the wavelengths from an elliptic shape into a circular shape, and which is made of a liquid crystal that forms the transmission surface and the reflection surface in the filled-up state having a trapezoidal section; and a liquid-crystal drive source which electrically drives the liquid crystal so that a refractive index of the liquid crystal is held constant irrespective of the wavelengths of the laser beams which enter said beam shaping mirror;

wherein said liquid-crystal drive source is adjusted in its ON state so that the refractive indices for the red laser beam and the infrared laser beam is brought into agreement with the refractive index for the blue laser beam in an OFF state of said liquid-crystal drive source, said liquid-crystal drive source is adjusted in its ON state so that the refractive indices for the blue laser beam and the infrared laser beam is brought into agreement with the refractive index for the red laser beam in the OFF state of said liquid-crystal drive source, or said liquid-crystal drive source is adjusted in its ON state so that the refractive indices for the blue laser beam and the red laser beam is brought into agreement with the refractive index for the infrared laser beam in the OFF state of said liquid-crystal drive source.

\* \* \* \* \*